US006324082B1

(12) United States Patent
Keller

(10) Patent No.: US 6,324,082 B1
(45) Date of Patent: Nov. 27, 2001

(54) MAINS FREQUENCY SYNCHRONOUS BURST MODE POWER SUPPLY

(75) Inventor: Anton Werner Keller, Arni (CH)

(73) Assignee: Thomson Licensing, S.A., Boulogne (FR)

( * ) Notice: Subject to any disclaimer, the term of this patent is extended or adjusted under 35 U.S.C. 154(b) by 0 days.

(21) Appl. No.: 09/588,050

(22) Filed: Jun. 6, 2000

(51) Int. Cl.$^7$ .................................................. H02M 5/45
(52) U.S. Cl. ............................................................ 363/37
(58) Field of Search ................................ 363/34, 37, 84

(56) References Cited

U.S. PATENT DOCUMENTS

| | | | |
|---|---|---|---|
| 3,710,062 | * 1/1973 | Peters, Jr. ............................. | 219/627 |
| 4,751,580 | 6/1988 | Fitzgerald et al. . | |
| 5,099,407 | * 3/1992 | Thorne .................................. | 363/37 |
| 5,369,561 | * 11/1994 | McCullough ......................... | 363/37 |
| 5,982,645 | * 11/1999 | Levran et al. ........................ | 363/37 |
| 5,995,388 | 11/1999 | Preller . | |
| 6,043,994 | 3/2000 | Keller . | |

* cited by examiner

*Primary Examiner*—Adolf Deneke Berhane
(74) *Attorney, Agent, or Firm*—Joseph S. Tripoli; Joseph J. Laks; Joseph J. Kolodka

(57) ABSTRACT

A synchronous burst mode power supply includes a power converter for transforming an AC mains from a relatively low frequency to a higher frequency, and a gate circuit responsive to the AC mains supply for enabling the power converter (2) to initiate a burst of output pulses at the higher frequency each time the AC mains supply occurs within a predetermined range. In an alternative embodiment, the power supply has a regulating circuit for regulating output from the power converter that includes a current feedback loop to the gate circuit for pre-regulating control of the power converter in response to load variations.

25 Claims, 4 Drawing Sheets

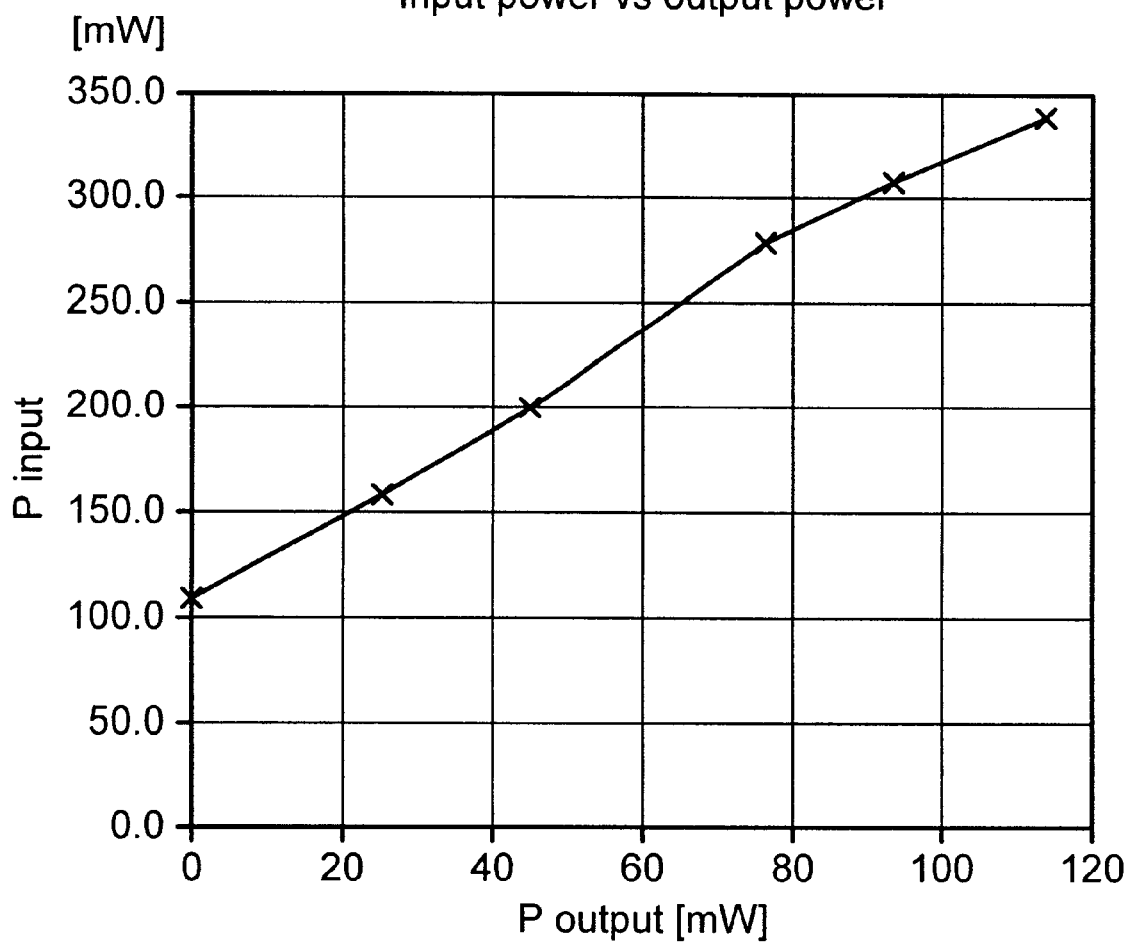

MAINS FREQUENCY SYNCHRONOUS BURST MODE POWER SUPPLY

BACKGROUND

This invention relates generally to the field of power supplies, and, in particular, to standby mode power supplies for television receivers.

The power consumed by electronic equipment in the standby mode is becoming an increasingly visible public policy issue. For example, an article in the Sep. 19, 1997, issue of Europe Energy reports that the European Commission regards reducing the energy consumed by electronic equipment in the standby mode of operation as a priority. The article further states that the Commission has concentrated its initial efforts at reducing the standby power consumption of televisions and VCRs, and that it has elicited voluntary commitments from manufacturers of such products to progressively reduce average standby power consumption.

Modern televisions can have a standby power consumption of about 5 to 10 Watts caused by the degaussing circuit and switched mode power supply running in standby mode. Televisions that have an additional standby power supply and disconnect the degaussing circuit can reduce the power consumption to 1 Watt.

In a conventional power supply arrangement for a video display apparatus, a primary winding of a standby transformer is coupled to the AC mains. A transformed voltage across a secondary winding of the standby transformer is full-wave rectified and is regulated by some form of linear regulation to provide power for the video display apparatus in a standby mode of operation. This standby power supply consumes power as long as the video display apparatus is connected to the AC mains, and thus also consumes power during the run mode of operation. During standby mode, power losses are incurred partly due to switching losses. U.S. Pat. No. 6,043,994 proposes a power supply for reducing standby power consumption attributable to a start-up resistor of the switched mode power supply controller integrated circuit IC.

It is therefore desirable to provide a simple and cost-effective method for reducing the standby power consumption attributable to the switching losses.

SUMMARY

The present invention is directed to a standby power supply circuit that reduces the standby consumption attributable to switching losses from coupling full AC mains to power conversion circuitry. A synchronous burst mode power supply includes a power converter for transforming an AC mains from a relatively low frequency to a higher frequency; and a gate circuit responsive to the AC mains supply for enabling the power converter to initiate a burst of output pulses at the higher frequency each time the AC mains supply occurs within a predetermined range. A method for providing synchronous burst mode power includes the steps of receiving an AC mains supply at a relatively low frequency, detecting when the AC mains supply occurs within a predetermined range, and initiating a burst of output pulses at a higher frequency than the relatively low frequency in response to the detecting step.

The above, and other features, aspects, and advantages of the present invention will become apparent from the following description read in conjunction with the accompanying drawings, in which like reference numerals designate the same elements.

BRIEF DESCRIPTION OF THE DRAWINGS

FIG. 4 is a graph of the range of input power verses output power.

Similar reference characters refer to similar elements in each of the drawings. Resistors values shown are in units of measure indicated as ohms, kilo-ohms (k), or Mega-ohms (M), and capacitor values are in units of measure indicated as microfarads (u) or picofarads (p).

DESCRIPTION OF THE PREFERRED EMBODIMENTS

The present invention reduces power losses associated with circuit switching in a standby switched mode power supply SMPS. The inventive standby SMPS is connected directly to a rippled but rectified mains voltage, which is then gated to the SMPS during periods of low levels of the rectified mains voltage. Gating of the rectified mains voltage to the standby SMPS, which responds by generating burst pulses, is synchronous with a predetermined range in the rectified mains voltage.

Figure 1:
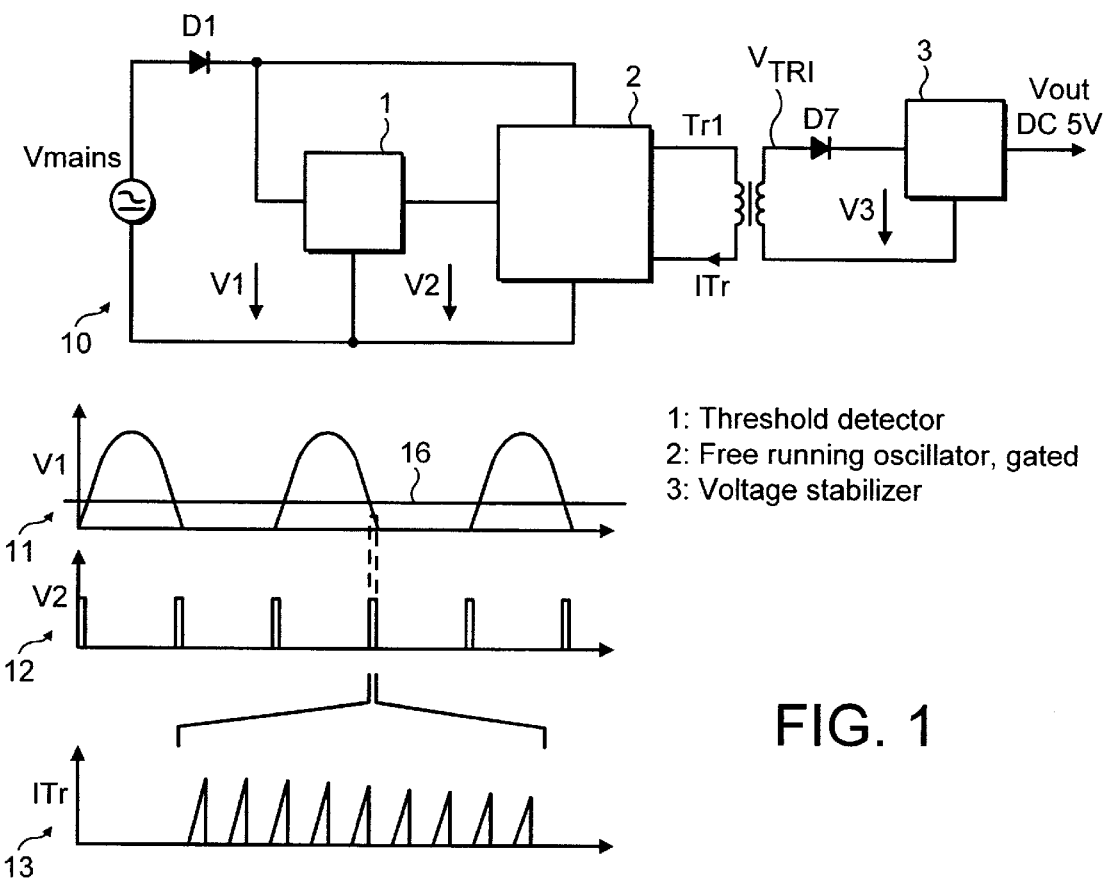
FIG. 1 shows a block diagram and waveforms that illustrate the present invention.

The invention is illustrated with a block diagram 10 and waveforms 11–3 in FIG. 1. A mains voltage Vmains is rectified by a diode D1 to provide rippled and positive half wave voltages V1 to a threshold detector 1. Voltage pulses V2 are output by the threshold detector 1 when the rise and fall of the positive half wave voltages V1 are below a threshold level (horizontal line 16 in graph 11 of FIG. 1). The voltage pulses V2 at the relatively low frequency of the mains voltage Vmains, for example 50 or 60 Hz, are converted by the free running oscillator 23 to sawtooth current pulses ITr at a higher frequency. In a sense, the detector acts as a gate with respect to passing part of the positive half-waves to the oscillator circuit 23. It is noted that the Ac mains voltage alone initiates and terminates the burst pulses V2, independent of any external switching control. In the exemplary embodiment of FIG. 1, nine sawtooth pulses ITr are generated for every voltage pulse V2 output by the detector 1. This number is related to the free running frequency of the oscillator, for example 25 kHz. Peaks of the sawtooth current pulses decrease in a linear sloping manner, as shown, because the positive half-wave pulse V1 imposed on the transformer Tr1 decreases from its peak to zero. Voltage imposed on a transformer follows the relationship (voltage/inductance) multiplied by time. In the present circuit the time factor is constant but the mains sine wave voltage increases from zero to a peak value and then decreases from its peak value to zero. The decrease from peak value to zero causes the linear decaying peaks in the sawtooth current pulses ITr. Conversely, during the rising edge of the mains voltage sine wave the peaks of the sawtooth current pulses ITr rise linearly.

The sawtooth current pulses ITr are transformed into a secondary winding voltage VTR1, which is then diode D7 rectified into an unregulated voltage V3. The unregulated voltage V3 is smoothed and regulated by a voltage regulator 3 to an output voltage Vout of 5V DC.

Figure 2:
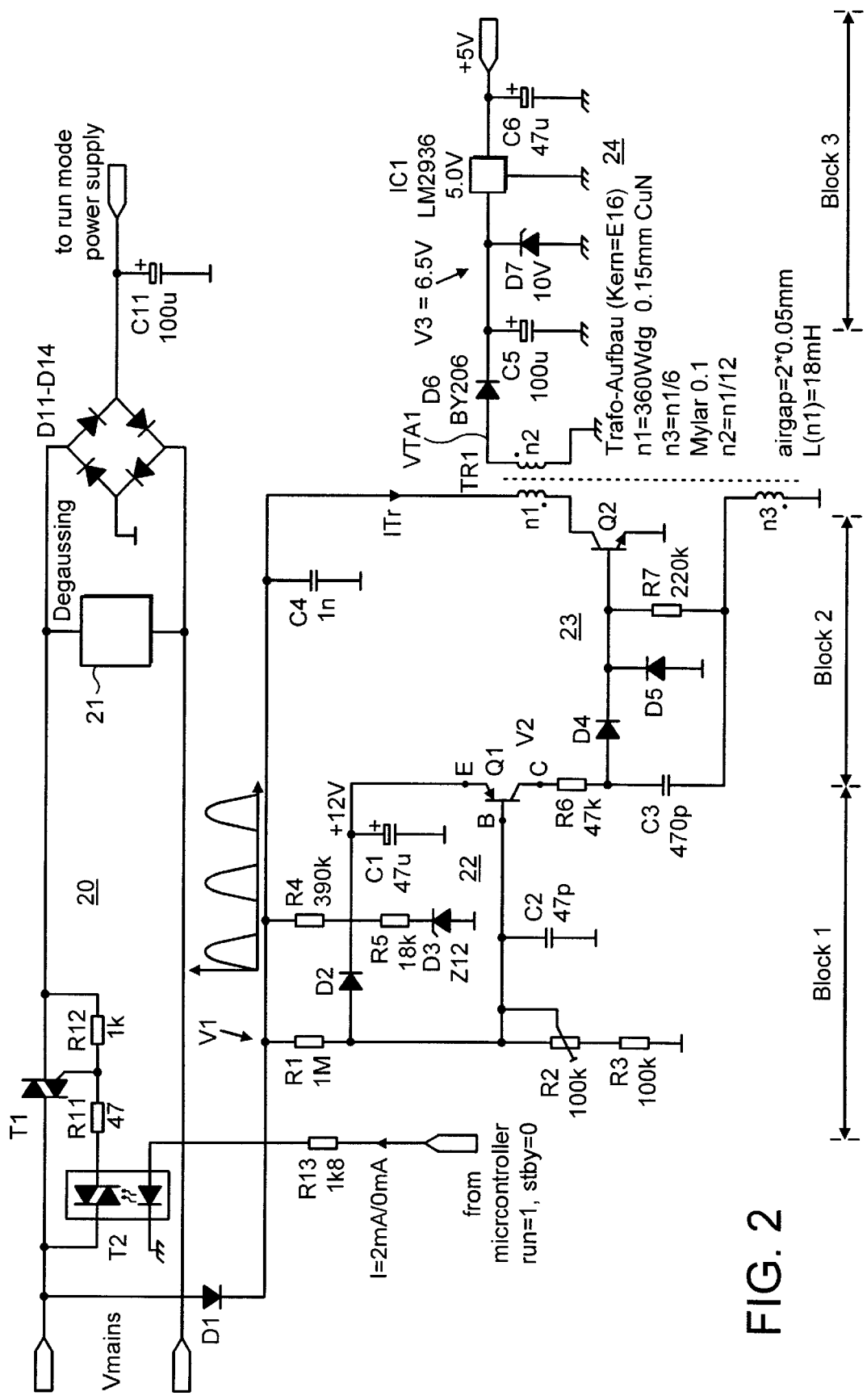
FIGS. 2 and 3 show schematic diagrams of standby power supplies that embody the present invention.

An exemplary circuit in FIG. 2 includes a circuit arrangement 20 for controllably coupling the voltage mains Vmains over to a connection point for a run mode power supply (not shown). The voltage mains Vmains is switched across an opto-relay, Triac T2, responding to a run control signal through current limiting resistor R13 from a known type of microcontroller (not shown). Alternative relay switches in lieu of triac driver T2 can be employed. The voltage Vmains is also coupled across a triac T1 triggered when the mains voltage is passed by the triac driver T2 and dropped across a voltage divider made up by resistors R11 and R12. The voltage mains Vmains passed by triac T1 is coupled across a degaussing circuit 21, full wave rectified by a diode bridge arrangement D11–D14 and filtered by capacitor C11 for a run mode power supply.

The circuit embodiment of FIG. 2 further includes exemplary circuit embodiments for the threshold detector 1, free running oscillator 2 and voltage stabilizer 3.

Positive half wave voltages V1 from the voltage mains Vmains rectified by diode D1 are voltage divided between resistors R4 and R5, voltage limited by zener diode D3, and ripple attenuated by capacitor C1 to provide +12V to the emitter terminal E of transistor Q1. Transistor Q1 is biased by voltage developed at its base terminal B from the rectifier arrangement of voltage divider resistors R1 and R3 and filtering capacitor C2. An optional adjustable resistor R2 allows for fine adjustment of the base terminal B voltage. Transistor Q1 is protected by diode D2 against a possible reverse biasing due to the +12V developed at the emitter terminal E of transistor Q. When the input voltage to the base terminal B of transistor Q1 is below a certain threshold, determined by the emitter E voltage of transistor Q1 and the voltage divider R4, R5 and D3, transistor Q1 turns on and provides the free running oscillator circuit 23 with a bias voltage. It is noted that resistor R5 adapts the on-time of the oscillator circuit 23 to different mains voltages.

In the threshold detector circuit 22, +12V at the positive terminal of capacitor C1 is compared with voltage at the base terminal B of transistor Q1. A positive voltage at terminal B of transistor Q1 greater than 0 and less than about 11.3 volts biases transistor Q1 on, providing the threshold level 16 of about 11.3 volts. Above 11.3 volts at base terminal B, PNP transistor Q1 is biased off. The threshold detector or gate circuit 22 provides low voltage level switching which reduces losses otherwise present in a typical switched mode standby power supply.

The oscillator 23 in FIG. 2 is a blocking oscillator formed by transformer Tr1, resistor R6, capacitor C3, secondary winding n3 and transistor Q2. The blocking oscillator operates in a conventional manner. It is noted that diodes D4 and D5 and resistor R7 are not necessary for basic operation of the oscillator circuit, but have been included as one form of signal conditioning. The depiction of blocking oscillator circuit 23 is merely exemplary and does not proscribe the use of other oscillator circuits or topologies in the context of the present invention.

Positive feedback provided by secondary winding n3 keeps transistor Q2 conducting. Current through base terminal B of transistor Q2 keeps capacitor C3 discharging until the voltage across the capacitor C3 is 1.4V, at which point transistor Q2 stops conducting and power is transferred to the secondary side via winding n2 in a flyback manner. When there is flyback voltage at the secondary winding n3 capacitor C3 is pulled down to negative. At this point current has to be fed through resistor R6 again to charge up capacitor C3 and start conduction of another saw tooth current ITR, derived from the positive half-wave pulses V1. Capacitor C4 reduces radiation of the fast switching.

The blocking oscillator 23 runs with an almost constant frequency that is dependent on the voltage Vmains, resistor R6, capacitor C3 and the relationship between windings n1 and n3. The duty cycle of the oscillation can be substantially constant so that the energy transferred to the secondary winding n2 is substantially constant. This substantially constant energy has two consequences. First, the standby power supply is inherently protected against a short circuit condition on the secondary side of the transformer Tr1. Second, parallel voltage regulation techniques can be used to regulate the voltages provided by the secondary windings n2. For example, in FIG. 2, the +5V output provided by the secondary winding n2 can be partly limited by zener diode D7 and regulated by the voltage regulator IC1. The use of voltage regulator IC1 and diode D7 is merely illustrative and does not preclude the applicability of other voltage regulation techniques in the context of the present invention.

In the embodiment of FIG. 2, the blocking oscillator 23 is advantageously used to transform the relatively low mains voltage frequency, for example 50 to 60 Hz, from which two voltage pulses V2 appear per cycle to a frequency from which nine sawtooth current pulses are generated for each voltage pulse V2. This transformation permits a decrease in the size of standby transformer Tr1, which in turn, leads to a decrease in the power consumption by the standby transformer Tr1. The secondary winding voltage VTR1, reaching 7.2V in the exemplary circuit, is initially rectified by diode D5, filtered by capacitor C5 and then regulated by the voltage regulator IC1. In case of reload, diode D7 prevents capacitor C5 and voltage regulator IC1 from too much voltage. Voltage output by the regulator IC is filtered by capacitor C6 to provide the +5V standby power.

Figure 3:
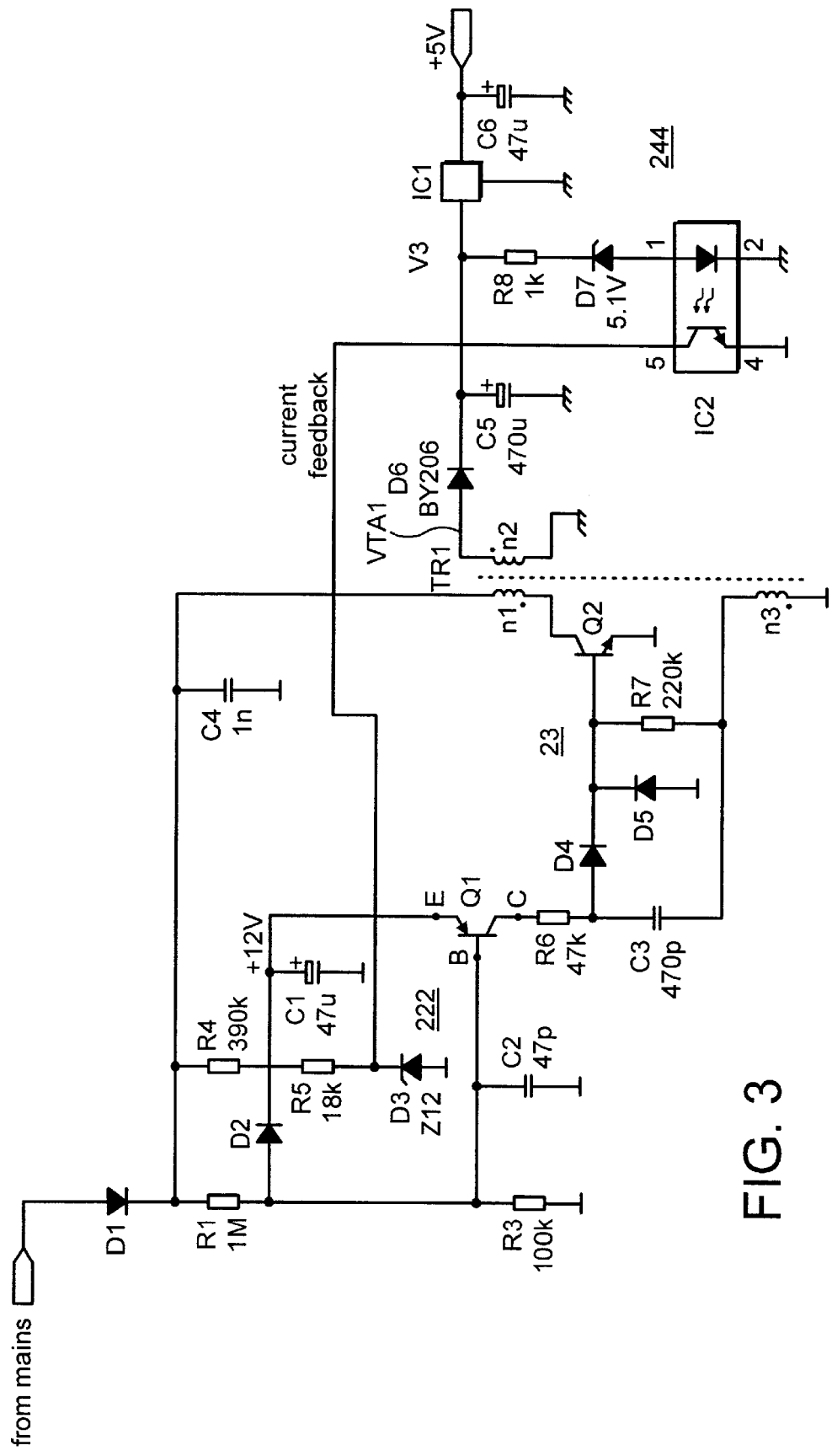

The circuit of FIG. 3 is similar to the standby power arrangement of FIG. 2, except for the current feedback loop from an additional opto-coupler IC2 coupled to the terminal between resistor R5 and zener diode D3 of the threshold detector circuit 22. The circuit embodiment of FIG. 2 is suited for a static load or a relatively small variation in load where resistor R2 can be adjusted to optimally time the initiation and termination of burst pulses suitable for the load amount. If R2 is optimally adjusted for a certain load and the actual load is relatively small then the burst pulse frequency will be too high and the power output will be greater than needed for the load, resulting in wasted power. Dynamic load applications are appropriate for the circuit embodiment of FIG. 3, where the current feedback adjusts the initiation and termination of burst pulses V2 by the gate circuit. The current feedback loop of FIG. 3 eliminates the need for the variable resistor R2 adjustment of FIG. 2.

The opto-coupler IC2 conducts whenever secondary voltage V3 is above a reference voltage developed across D7. Conduction by the opto-coupler IC2 reduces the reference voltage for the emitter of transistor Q1 via current I1 in the feedback loop, which reduces the on time of the free running oscillator circuit 22. As a consequence, the input power is reduced when load decreases, and the voltage controlling potentiometer R2 in the circuit embodiment of FIG. 2 is unnecessary.

FIG. 4 is a graph of the range of input power versus output power demonstrating the increased efficiency provided by the invention. An ordinary power supply will ordinarily consume 1 W to output 200 mW, representing a 20% power conversion efficiency. As the graph of FIG. 4 demonstrates, for example, that with the inventive gating on of momentary low voltage mains an input mains voltage power Pinput of approximately 337 mW is converted to standby power of approximately 115 mW. This represents an increase in power conversion efficiency to approximately 30%.

The standby transformer TR1 may be constructed using an EF16, N67 core with an air gap equal to approximately 0.1 mm. The inductance of the primary winding n1 of the standby transformer Tr1 may be equal to approximately 18 mH, using approximately 160 turns, in two layers, of 0.1 mm diameter CuL wire.

Approximately one layer of 0.1 mm thickness MYLAR® brand polymeric film may be used to provide electrical isolation between the two layers of wire to reduce parasitic capacitance. The secondary winding n2 may use 23 turns of 0.315 mm diameter CuL wire, and the secondary winding n3 may use 16 turns of 0.315 mm diameter wire. Approximately 2 layers of 0.1 mm thickness MYLAR® brand polymeric film may be used to provide electrical isolation between the primary winding n1 and the secondary windings n2 and n3.

It will be apparent to those skilled in the art that, although the invention has been described in terms of specific examples, modifications and changes may be made to the disclosed embodiments without departing from the essence of the invention. For example, in the embodiment discussed portions of positive half-wave voltage levels between 0 and 12V were shown to be passed to the oscillator circuit 23. However, the inventive Ac mains initiated and termination of burst pulses could be practiced with a threshold range of 2V to 12V. However, the 0 to 12V range is preferable because the lower zero boundary makes the circuit design simpler. Also, in lieu of the preferred gating of positive half-waves from the Ac mains, full wave rectified pulses of the AC mains could be gated to the oscillator circuit 23. However, gating of full wave rectified AC mains pulses would require dissipating excess power, not needed for standby mode operation, thereby making the power supply circuit less efficient. Accordingly, reference should be made to the appended claims, rather than to the foregoing specification, as indicating the true scope of the invention.

What is claimed is:

1. A synchronous burst mode power supply comprising:
    a power converter for transforming an AC mains from a relatively low frequency to a higher frequency; and
    a gate circuit responsive to said AC mains supply for enabling said power converter to initiate a burst of output pulses at said higher frequency each time a momentary amplitude of said AC mains supply occurs within a predetermined range.

2. The power supply according to claim 1, further comprising means for regulating a transformed output) from said converter circuit to a standby voltage, said means being coupled back to said gate circuit for controlling operation of said power converter circuit in response to load changes to said power supply.

3. The power supply according to claim 1, wherein said power converter comprises a self-oscillating circuit and said gate circuit enables operating of said self-oscillating circuit only during two periods of each cycle of said supply from said AC mains when said supply has a single voltage polarity.

4. The power supply according to claim 1, wherein said gate circuit comprises a threshold detector circuit for generating voltage pulses when detecting portions of positive waveforms of said mains voltage within said predetermined range.

5. The power supply according to claim 4, wherein said threshold detector comprises a transistor biased at its base terminal by a first voltage division of said positive waveforms to pass said voltage pulses from a second voltage division of said positive waveforms.

6. The power supply circuit of claim 5, wherein said first voltage division comprises a resistor pair divider coupled to a base terminal B of said transistor, and said second voltage division comprises a resistor pair coupled to said positive waveforms and an emitter terminal of said transistor.

7. The power supply circuit of claim 4, wherein said power converter circuit comprises a free running oscillator circuit for converting said voltage pulses from said gate circuit at a first frequency to current pulses at a second frequency greater than said first frequency.

8. The power supply circuit of claim 7, wherein said free running oscillator circuit comprises a transistor biased at its base terminal B by said voltage pulses that are rectified by a first diode and then charge a first capacitor for enabling said second transistor to conduct said current pulses, said current pulses being derived from said positive waveforms ripple attenuated by a second capacitor coupled to an emitter terminal of said second transistor, said positive waveforms energizing a primary winding of a transformer to develop in a flyback manner a secondary winding voltage across a secondary winding of said transformer.

9. The power supply circuit of claim 7, further comprising a voltage regulating circuit coupled to a secondary winding of a transformer having a primary winding coupled to said free running oscillator circuit, said secondary winding developing a secondary voltage from said current pulses conducted through a primary winding of said transformer.

10. The power supply circuit of claim 9, wherein said voltage regulating circuit comprises an integrated voltage regulator coupled to a diode and a first capacitor arrangement for rectifying and filtering said current pulses from said secondary winding to provide a secondary voltage stabilized by said integrated voltage regulator, said secondary voltage being filtered by a second capacitor to provide a standby voltage.

11. The power supply circuit of claim 7, further comprising a voltage regulating circuit coupled to a secondary winding of a transformer having a primary winding through which said current pulses controllably conduct to develop a secondary winding voltage that is coupled back to and adjust on-time operation of said threshold detector circuit.

12. A synchronous burst mode standby power supply comprising:
    a self-oscillating power converter for receiving an AC mains supply;
    a transformer primary winding coupled to said power converter and receiving pulses therefrom for generating a supply of power at a secondary winding of said transformer; and
    a gate circuit coupled to said AC mains supply and said power converter, wherein said gate circuit enable operation of said self-oscillating power converter while a momentary amplitude of said AC mains supply cycles through a predetermined range.

13. The power supply circuit of claim 12, wherein said gate circuit comprises a threshold detector for generating voltage pulses when detecting positive waveforms of said mains voltage below a threshold.

14. The power supply circuit of claim 13, wherein said threshold detector comprises a transistor biased at its base terminal by a first voltage division of said positive waveforms to pass said voltage pulses from a second voltage division and filtering of said positive waveforms.

15. The power supply circuit of claim 14, wherein said first voltage division comprises a first resistor pair divider coupled to a base terminal B of said transistor, and said second voltage division comprises a second resistor pair coupled between said positive waveforms and an emitter terminal of said transistor.

16. The power supply circuit of claim 2, wherein said self-oscillating power converter circuit converts said voltage pulses at a first frequency to current pulses at a second frequency greater than said first frequency.

17. The power supply circuit of claim 16, further comprising a voltage regulating circuit coupled to a secondary winding of a transformer having a primary winding through which said current pulses controllably conduct to develop a secondary winding voltage that is coupled back to said threshold detector for influencing on-time operation of said self-oscillating power converter.

18. The power supply circuit of claim 17, wherein said voltage regulating circuit comprises an integrated voltage regulator, coupled to a diode D6 and capacitor arrangement, for receiving said secondary winding voltage and providing a voltage input for said integrated voltage regulator, and an opto-coupler coupled to said integrated voltage regulator for conducting current derived from said secondary winding voltage back to said threshold detector when said voltage input is above a reference voltage.

19. The power supply circuit of claim 18, wherein said reference voltage is developed across a resistor and zener diode arrangement coupled between the voltage input and said opto-coupler.

20. A method for providing synchronous burst mode power comprising the steps of:

receiving an AC mains supply at a relatively low frequency;

detecting when a momentary amplitude of said AC mains supply occurs within a predetermined range, and initiating a burst of output pulses at a higher frequency than said relatively low frequency responsive to said detecting step.

21. The method according to claim 20, further comprising the step of terminating further initiation of said burst of output pulses responsive to said detecting.

22. The method according to claim 20, wherein said detecting step comprises when said AC mains occurs below a first threshold and above a second threshold.

23. The method according to claim 20, further comprising the step of regulating said output pulses to a standby voltage output.

24. The method according to claim 20, further comprising the step of controlling timing of said initiating by a voltage derived from said output pulses.

25. The method according to claim 21, further comprising the step of controlling timing of said initiating and terminating by a voltage derived from said output pulses.

\* \* \* \* \*

UNITED STATES PATENT AND TRADEMARK OFFICE
CERTIFICATE OF CORRECTION

PATENT NO. : 6,324,082 B1 Page 1 of 1
APPLICATION NO. : 09/588050
DATED : November 27, 2001
INVENTOR(S) : Anton Werner Keller It is certified that error appears in the above-identified patent and that said Letters Patent is hereby corrected as shown below:

Column 7, Line 1, please delete "2" and insert therefor --12--.

Signed and Sealed this

Fifth Day of February, 2008

JON W. DUDAS
*Director of the United States Patent and Trademark Office*